Dec. 22, 1953
L. M. ILGENFRITZ
2,663,190
HUMIDITY INDICATOR
Filed Nov. 16, 1950
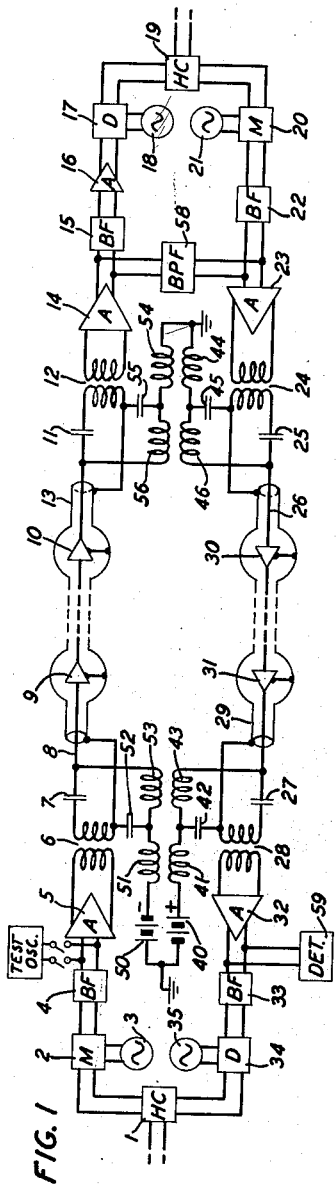
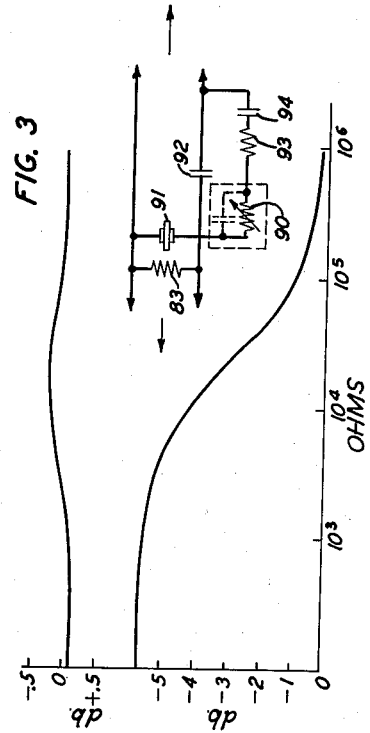
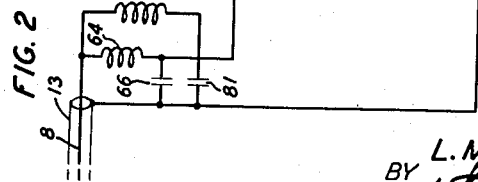
INVENTOR
L. M. ILGENFRITZ
BY
ATTORNEY Patented Dec. 22, 1953

2,663,190

UNITED STATES PATENT OFFICE 2,663,190

HUMIDITY INDICATOR

Lester M. Ilgenfritz, Mamaroneck, N. Y., assignor to Bell Telephone Laboratories, Incorporated, New York, N. Y., a corporation of New York Application November 16, 1950, Serial No. 196,006

10 Claims. (Cl. 73—335)

The object of the present invention is means for measuring the relative humidity within a container enclosing an electronic amplifier.

A feature of the invention is the association with the feedback, or beta, circuit of an amplifier, of a resonant device, such as a crystal, sharply resonant over a narrow band of frequencies characteristic of the amplifier.

Another feature of the invention is a reactance device associated with the resonant device to form a combination which is antiresonant at a frequency outside the characteristic band of frequencies.

A further feature of the invention is a humidity sensitive element associated with the reactance device to modify the damping of the antiresonant combination with changes in the relative humidity within the container enclosing the amplifier, without materially affecting the response of the resonant device within the characteristic band of frequencies.

While the invention may be used for the determination of the relative humidity in any container enclosing an amplifier designed in accordance with the invention, it is particularly adapted for determining the relative humidity in containers embodied in long cables, such as submarine cables, laid in inaccessible locations. In recent years, the use of long cables for the transmission of intelligence, such as telephone and telegraph cables, has been rapidly increased, and has aroused interest in the problem of using cables of this general character through territory, such as the ocean or other large body of water, in which the cable is not easily accessible. Due to the transmission losses in such cases, the transmitted waves must be amplified at rather short intervals, thus necessitating the use of amplifiers spaced from thirty to fifty miles apart along the cables. These amplifiers are encased within an enlargement of the cable sheath, and, though, with skillful design and good materials, the average useful life of the amplifiers is satisfactory, it is important to be able to test the electrical conditions of each amplifier from some accessible spot, such as the cable terminals. By such tests, any gradual deterioration in the amplifiers may be measured at suitable intervals, and arrangements made to repair, or replace, a faulty amplifier in a season of the year when weather conditions are favorable, materially reducing the cost of the necessary cable ship operations.

In systems of this character, the amplifiers are connected in series with the cable conductor, and direct current may conveniently be supplied over the cable conductor to the amplifiers to energize the heaters of the amplifiers and to activate the anode circuits. Faults which develop in this direct-current circuit may be determined by the usual direct current, or low frequency, tests, but other faults, such as a slow decrease in the gain of an amplifier may develop, which will affect the transmission of the signals, even though the direct-current circuit is substantially unaffected.

A satisfactory system for testing such amplifiers should not require for its operation the transmission of any substantial amount of signal power, to avoid overloading the amplifiers; should be compact, stable, and rugged; and should not add any appreciable hazard to the successful operation of the system.

A system for testing the condition of such amplifiers is disclosed in my copending joint application Serial No. 133,538, filed December 17, 1949, now patent 2,580,097, patented December 25, 1951, by L. M. Ilgenfritz and R. W. Ketchledge. The present invention is a modification of the system disclosed in my said application to provide means for measuring the relative humidity in the containers enclosing the amplifiers.

The various sections of the amplifiers and associated networks are usually assembled in containers enclosed within the cable sheath. Precautions are taken to dry all the electrical elements in the containers, and some desiccative material is usually placed in one of the containers to absorb any moisture that may develop after the drying process. However, it is possible that the container may be unduly exposed during the manufacture, or laying, of the cable; or, that moisture may be produced in the container from the alternate heating and cooling of the enclosed elements in service; by some physical or chemical action in the elements of the amplifier; or by permeating through some defect in the container. By the present invention, the relative humidity in the container of any desired amplifier may be determined at any time after the amplifier is assembled, or during the laying of the cable or after the cable is in service.

In the drawings, Fig. 1 shows a typical cable system embodying the invention;

Fig. 2 is a schematic circuit of the amplifiers shown in Fig. 1; and

Fig. 3 shows the effect of changes in the humidity sensing element on the amplifier gain.

The system shown in Fig. 1 includes two one-way cables connected to form a two-way system. Signal waves supplied to the hybrid coil 1 are transmitted to the modulator 2, where the waves modulate the waves from a carrier wave source 3, and a product of this modulation is selected by a band-pass filter 4 and supplied to the input circuit of amplifier 5. Signal waves from other sources also may be modulated with waves from other carrier sources, filtered, and also supplied to amplifier 5. The output of amplifier 5 is connected by transformer 6 and capacitor 7 to the central conductor 8 of the cable, then, through the cable, and associated amplifiers 9, 10, etc., capacitor 11, and primary winding of transformer 12, through the return conductor 13 back to transformer 6. The output of transformer 12 is conducted through amplifier 14, band-pass filter 15, amplifier 16 to demodulator 17 where the modulated carrier waves are demodulated with waves from source 18, the signal currents being supplied through hybrid coil 19 to the line.

Signals supplied to the hybrid coil 19 modulate the carrier waves from source 21 in the modulator 20, and the desired products of modulation are selected by band-pass filter 22 and supplied to amplifier 23. The output of amplifier 23 is supplied through transformer 24 and capacitor 25 to the central conductor 26 of the other cable, thence through this conductor, amplifiers 30, 31, etc., capacitor 27 and primary winding of transformer 28. The output of transformer 28 is supplied through amplifier 32 and band-pass filter 33 to demodulator 34 where it is demodulated by carrier waves from source 35, the signal currents passing through hybrid coil 1 to the line.

The vacuum tubes in the amplifiers are preferably of the indirectly heated cathode type, with the heaters connected in series with each other and the central conductor of the cable. The anode circuits of the vacuum tubes are energized by the voltage drop across the heaters of an amplifier. Direct current is supplied to the heaters through the central conductor of the cable, thus, in a long cable having a large number of heaters in series, the voltage required may be quite high, and to reduce the maximum voltage required, two or more sources may be used.

Current from the grounded source 40 will flow through the low-pass filter formed by the inductors 41, 43 and capacitor 42, the central conductor 26, and the heaters of the vacuum tubes in amplifiers 31, 30 to ground through the low-pass filter formed by the inductors 46, 44 and capacitor 45. Similarly, current will flow from ground through the low-pass filter formed by inductors 54, 56 and capacitor 55, the central conductor 8, and the heaters of the vacuum tubes in amplifiers 10, 9 through the low-pass filter formed by inductors 53, 51, and capacitor 52 to the grounded source 50.

When each cable includes a large number of amplifiers and it is necessary to limit the portion of the available frequency range assigned for the crystals, each cable may be individually tested by using a test set for each cable. In cases where the limitations on the portion of the available frequency range which may be assigned to the crystals is unimportant, or only a few amplifiers are encased in the cable, the far ends of the cables may be connected by a band-pass filter 58, and the test set 59 connected to the near receiving end, thereby conserving testing apparatus and centralizing all the amplifier testing facilities. In this latter arrangement the tests on all amplifiers in both directions are made from the one terminal.

The amplifier shown in Fig. 2 is designed to operate over a band width from 12 to 124 kilocycles, but this invention is not in any way limited thereby and may be adapted for use in conjunction with amplifiers operated over other bands of frequencies.

In Fig. 2, the direct current from the center conductor 8 of the cable flows through inductor 63, the heaters of tubes 62, 61, 60 in series, inductor 64, and the center conductor 8 of the cable to the next amplifier. The inductors 63, 64 with capacitors 65 and 66 reduce the flow of alternating currents in this path. The screen grid and anode of tube 60 are energized from this circuit through the interstage network 67, the screen grid and anode of tube 61 are similarly energized through the interstage network 68. The screen grid of tube 62 is connected directly to the heater of this tube, while the anode of tube 62 is energized through the beta network 69 and the primary winding of transformer 70.

The cathodes of tubes 60, 61, and 62 are respectively biased in the usual manner by the cathode biasing resistors 71, 73, and 75, respectively shunted by the by-pass capacitors 72, 74, and 76. The carrier waves flow from the central conductor 8 of the cable through the primary winding of transformer 80 and capacitor 81. The secondary winding of transformer 80 is tuned by the shunt capacitor 82 and is connected to the signal grid of tube 60, and through resistors 83 and 71 to the cathode of this tube. The output circuit of tube 60 is connected through the interstage network 67 to the signal grid of tube 61; similarly the output circuit of tube 61 is connected through the interstage network 68 to the signal grid of tube 62. The output circuit of tube 62 is connected through the primary winding of transformer 70, tuned by the shunt capacitor 85, the beta network 69, capacitor 84 and resistor 75 to the cathode of tube 62. The secondary winding of transformer 70 is connected to the central conductor of the cable and through capacitor 86 to the sheath of the cable.

The attenuation of a section of cable between amplifiers may be some 45 decibels larger for the high frequencies than for the low frequencies, thus, the response frequency characteristic of the amplifier should be shaped to equalize this variation and produce a substantially flat response frequency characteristic of the section of cable with the amplifier over the desired band. For convenience of design, the required change may be distributed among the contributions of the input network, the output networks, and the beta or feedback network.

The amplifier described above has an odd number, three, of stages of amplification, thus, the feedback circuit is connected from the output circuit to the signal grid forming part of the input circuit. If the repeater is designed to have an even number of stages, the feedback circuit may be connected from the output circuit to the cathode of the first tube. Obviously, if desired, a feedback loop may include less than all the stages of amplification in the amplifier.

In so far as the present invention is concerned, no claim of novelty is advanced with respect to the elements of the amplifier described up to the present point. The novelty of the present invention is in the association of the humidity sensing element 90, the crystal 91 and the capacitor 92, with the other elements of the amplifier. While for completeness of disclosure, a specific type of amplifier has been described, the scope of the invention is not limited thereby as the invention may be embodied in any suitable amplifier having a feedback circuit.

The crystal 91 may be connected to form a series resonant shunt across the beta circuit, decreasing the feedback over a very narrow band of frequencies, and thus increasing the gain of the amplifier over the narrow band of frequencies, to form a narrow peak or spike in the mean frequency characteristic of the amplifier. The frequencies of resonance of the crystals are different for each amplifier, so that each amplifier has a peak or spike at a frequency uniquely identifying that amplifier and only that amplifier. However, if it is necessary to conserve band width, two or more amplifiers could be assigned the same crystal frequency, though this will entail some sacrifice of information concerning specific amplifiers.

Due to their very sharp resonant characteristics, crystal resonators may conveniently be used for this purpose, but the invention is not limited thereto, as other resonators, such as mechanical resonators, simple electrical tuned circuits, or cavity resonators may be used, depending upon the range of frequencies to be transmitted, and the portion of the range assigned for this purpose.

The present invention is designed for the transmission of signals in the range from 12 kilocycles per second to 124 kilocycles per second and this part of the band is divided into twenty-eight channels, 4 kilocycles wide. The crystals have a minimum pass band of one or two cycles per second, and each crystal occupies about 100 cycles of the band so that the response characteristics of 40 crystals may be located in one channel 4,000 cycles wide. Any channel may be reserved for this service, though preferably, a channel is selected such that the number of useful channels is not reduced. Thus, in the present amplifier, the crystal peaks are located in the channel from 120 to 124 kilocycles per second.

The crystals 91 may be designed to produce a 25-decibel increase in gain over a band of one or two cycles, and such a large change in gain will be accompanied by a large phase irregularity, which changes sign at the resonant frequency of the crystal and may reduce the phase margin to such an extent that the amplifier may be only conditionally stable, or even definitely unstable.

The capacitor 92 has the usual function of blocking the positive direct anode potential of tube 62 from the signal grid of tube 60. In addition, the time constants of the combination of capacitor 92 and resistor 83 must be of such value as to preserve the proper gain frequency characteristic of the mu-beta loop to insure adequate low frequency phase margin for stability.

Capacitor 92 also has another important function, that is, to provide a reactance at crystal resonance such that the reactance forms a potential divider with the resonant resistance of the crystal. This potential divider controls the feedback voltage at resonance, and so determines the height of the gain spike. The spike magnitude in the mu-beta path is proportional in decibels to $20 \log 1/\omega CR$ where C is the capacitance of capacitor 92 and R is the series resonance resistance of the crystal.

At a frequency just above series resonance, the crystal becomes a positive reactance, and this positive reactance will resonate with the negative reactance of the capacitor 92, when the two effective reactances become equal. The capacity of capacitor 92 is selected so that this antiresonance will be only about 10 cycles above the frequency of crystal resonance. If the circuit losses are low in this region, the upper antiresonance will build up the feedback voltage on the grid of the vacuum tube 60 many times above normal at this frequency, resulting in a second spike, of opposite sense, or dip.

It is a well-known property of electrical circuits of the minimum phase shift type, that a deviation of circuit loss which is all positive, or all negative, is accompanied by a phase irregularity which is both positive and negative; whereas a deviation of circuit loss which has closely spaced positive and negative peaks is accompanied by a phase irregularity which is all in one sense, the sense of the phase irregularity being determined by the sense of the attenuation deviations. In the present amplifier the mu-beta gain, or feedback, is greatly reduced at a frequency just above the transmitted band, resulting in a net gain peak, or spike, in the response frequency characteristic of the amplifier. Due to the resonance with the reactance of the capacitor 92 at a slightly higher frequency, the mu-beta gain, or feedback is greatly increased, which results in a net gain dip for the amplifier. In this frequency range, the mu-beta phase margin is low, usually about 30 or 40 degrees, that is, the phase is displaced 140 or 150 degrees from mid-band phase. Obviously, if the phase irregularity accompanying the gain spike is in the direction of reducing the phase margin, the amplifier may become unstable, a condition which must be avoided. By choosing the type of irregularity shown, that is, a decrease and then an increase of feedback, the phase irregularity approaches 90 degrees at the gain peak and at the dip, with still larger values between the two irregularities, this change being back toward the mid-band phase, thus increasing the phase margin and stability of the amplifier.

The thermal noise currents generated in the cable resistance are amplified by the amplifier, and are uniformly distributed over a wide frequency range. As the higher frequencies these thermal noise currents are amplified by each amplifier with very little additional noise current due to the amplifier input elements, circuit resistances, and shot effects. At the frequency of resonance of the crystal 91 where the gain of the amplifier increases over a narrow band, this noise energy per cycle of band width is also increased by the amount of the gain peak. In the output circuit of the amplifier, there will be found a noise spectrum in which a relatively large amount of noise energy is located at the frequency of resonance relative to that a few cycles higher or lower. In a system comprising a number of amplifiers and cable sections, in tandem, the total noise energy at the receiving end will be composed of the sum of the noise spectra in each amplifier output. Since each amplifier peak is at a slightly different frequency, there must be a tunable, narrow band, noise measuring device at the receiving terminal in order to pick out and measure the noise peak which identifies each particular amplifier. As shown in Fig. 1, a detector 59, which may conveniently be a heterodyne frequency analyzer of the type shown in United States Patent 1,976,481, October 9, 1934, T. G. Castner, is connected to the receiving end of the cable. This detector 59 preferably has a pass-band only a cycle or so wide, and is successively used to measure the successive peaks of noise current from the cable. These noise peaks may have amplitudes of some 20 to 25 decibels above the average noise level, although due to the successive addition of noise energy in the successive amplifier outputs, the peaks will not be at uniform height. In general, the larger the number of amplifiers, the greater should be the peak magnitude in each individual amplifier to preserve a good margin for identification at the receiving end of the system.

The magnitude of the gain dip which is caused by antiresonance of the crystal 91 and the capacitor 92 may be altered considerably by adding dissipation to the antiresonant circuit, without disturbing seriously the phase of the feedback loop or other functions of the amplifier or crystal circuit. This gain dip thus provides a means of measuring some quantity relating to the amplifier such as the moisture content of the atmosphere within the amplifier container.

Dissipation may be introduced in the antiresonant circuit by connecting a resistor sensitive to the humidity of the container, in the circuit, preferably, as shown by element 90, in shunt with the capacitor 92. The humidity sensing element 90 may conveniently consist of a polystyrene tube about one-half inch in diameter and one and one-quarter inches long on which are wound two spaced palladium wires, serving as electrodes, and coated with a plastic mixed with lithium chloride, or lithium bromide. Electrically, an element of this character is equivalent to a capacitor of about 10 micromicrofarads, shunting a resistance which may be many megohms in a dry atmosphere, or only a few hundred ohms in a moist atmosphere. When the atmosphere within the amplifier container is very dry, this element will have substantially no effect on the amplifier performance, since its resistance will be many megohms and its capacity effect negligible. At the opposite end of the humidity scale, the element would tend to form a shunt across the capacitor 92 of undesirably low resistance, thus the element 90 is connected in series with a limiting resistance provided by the resistor 93. As it is essential to block the direct-current path from the anode of the vacuum tube 62 to the control grid of the tube 60, a small capacitor 94 is connected in series with the resistor 93. The capacitor 94 also serves to preserve the mu-beta gain characteristic at very low frequencies, when the resistance of the sensing element is low. The change in mu-beta gain as the resistance of the sensing element changes from zero to infinity is of the order of .3 decibel or less from 2 kilocycles upward, and about 1 decibel at 1,000 cycles, where there is a large phase margin in the feedback loop.

As shown in the upper curve of Fig. 3, the effect of the variation of the resistance of the element 90 on the gain of the amplifier at the spike frequency is not more than about .4 decibel, and for a dry atmosphere is about .1 decibel. The effect of the humidity sensitive circuit on the net gain of the amplifier is negligible at all other frequencies. The lower curve of Fig. 3 shows the effect of changes in the resistance of the humidity sensitive element 90, upon the amplifier gain dip (mu-beta gain peak). For high humidities, say above about 15 per cent, the change in the gain dip is nearly 6 decibels. This change approaches zero at about 6 per cent relative humidity. As the amplifier gain dip normally has a magnitude of from 20 to 25 decibels, the change in this magnitude, due to the changes in the element 90, may readily be measured by means of a test oscillator of known output connected across the input to amplifier 5, Fig. 1, and the calibrated detector 59.

What is claimed is:

1. The combination with an amplifier having an input and an output circuit, a capacitor connected from the output to the input circuit to form a negative feedback connection, a sharply resonant device connected across said input circuit and forming with said capacitor an antiresonant combination, a resistor, sensitive to the humidity of its surroundings, connected in said antiresonant combination to vary the damping of said combination with variations in said humidity and means connected to said amplifier to measure the variations in amplification of said amplifier with variations in said resistor.

2. The combination in claim 1 in which said sharply resonant device is a vibrating crystal having a natural frequency of resonance.

3. The combination in claim 2 in which said capacitor and crystal are antiresonant at a frequency higher than the resonant frequency of the crystal.

4. The combination in claim 1 in which said resistor is connected in parallel relationship with said capacitor.

5. The combination in claim 1 with a second resistor and a second capacitor connected in serial relationship with said resistor across said capacitor.

6. In combination with a cable connecting in serial relationship a plurality of amplifiers, each amplifier having an input circuit and an output circuit, a capacitor individual to each amplifier connected from the output circuit to the input circuit to form a negative feedback connection, a sharply resonant device individual to each amplifier connected across the input circuit to form with said capacitor a combination antiresonant at a frequency uniquely characterizing the amplifier, a resistor, sensitive to the humidity of its surroundings, connected in each antiresonant combination to vary the damping of the combination with variations in the humidity and measuring means connected to said cable to measure the variations in amplification of said amplifiers with variations in said resistors.

7. The combination in claim 6 in which the sharply resonant device is a crystal having a natural frequency of resonance uniquely characteristic of the amplifier.

8. The combination in claim 6 in which said resistor is connected in parallel relationship with said capacitor.

9. The combination in claim 6 with a second resistor and a second capacitor connected in serial relationship with said resistor across said capacitor.

10. The combination in claim 6 in which said measuring means includes an oscillator and a heterodyne frequency analyzer connected to said cable and tunable to the characteristic frequencies of the amplifiers.

LESTER M. ILGENFRITZ.

References Cited in the file of this patent

UNITED STATES PATENTS

| Number | Name | Date |
| --- | --- | --- |
| 1,661,263 | Nyquist | Mar. 6, 1928 |
| 2,295,570 | Dunmore | Sept. 15, 1942 |
| 2,522,348 | Dahline | Sept. 12, 1950 |

FOREIGN PATENTS

| Number | Country | Date |
| --- | --- | --- |
| 591,172 | Great Britain | Aug. 8, 1947 |